United States Patent
Jacobs et al.

(10) Patent No.: US 10,104,340 B2
(45) Date of Patent: *Oct. 16, 2018

(54) METHOD FOR COLLECTIVE CONTRIBUTION VIDEO CREATION AND MESSAGING

(71) Applicant: BITON, LLC, Cheyenne, WY (US)

(72) Inventors: Jonathan Jacobs, Spring, TX (US); Anthony Pernice, New York, NY (US)

(73) Assignee: BITON, LLC, Cheyenne, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,689

(22) Filed: Feb. 26, 2018

(65) Prior Publication Data

US 2018/0184048 A1    Jun. 28, 2018

Related U.S. Application Data

(63) Continuation of application No. 15/478,625, filed on Apr. 4, 2017, now Pat. No. 9,906,755, which is a continuation of application No. 15/475,324, filed on Mar. 31, 2017.

(60) Provisional application No. 62/316,029, filed on Mar. 31, 2016.

(51) Int. Cl.
    *H04N 7/15*    (2006.01)
    *H04L 12/18*   (2006.01)

(52) U.S. Cl.
    CPC .................. *H04N 7/155* (2013.01)

(58) Field of Classification Search
    CPC combination set(s) only.
    See application file for complete search history.

(56) References Cited

U.S. PATENT DOCUMENTS

| | | | |
|---|---|---|---|
| 2007/0255807 A1* | 11/2007 | Hayashi | H04L 67/306 709/219 |
| 2013/0144868 A1* | 6/2013 | Ickman | G06F 17/30864 707/722 |
| 2015/0195097 A1* | 7/2015 | Grigsby | H04L 12/1845 715/753 |

* cited by examiner

*Primary Examiner* — Joseph J Nguyen
(74) *Attorney, Agent, or Firm* — Ryan, Mason & Lewis, LLP

(57) ABSTRACT

Disclosed herein is a method for collective contribution video creation and messaging wherein story-based communications are created among multiple users. The disclosed method uses a program or application wherein a virtual object is used to authorize a particular user to make the immediate post to the applicable story communication. The possession of the virtual object also indicates that any user that does not have possession of the virtual object is unable to presently contribute to the group storyline. Once the user in possession of the virtual object submits his or her content, the virtual object is made available. Any user inside the story seeking to gain control may then attempt to obtain the virtual object. The present disclosure aids users in creating story timelines of their contributions, as well as promoting full contribution from all group members in messaging.

20 Claims, 2 Drawing Sheets

METHOD FOR COLLECTIVE CONTRIBUTION VIDEO CREATION AND MESSAGING

CROSS REFERENCE TO RELATED APPLICATIONS

This application is a Continuation of U.S. patent application Ser. No. 15/478,625, filed on Apr. 4, 2017, which is a Continuation of U.S. patent application Ser. No. 15/475,324, entitled "Method for Collective Contribution Video Creation and Messaging", filed Mar. 31, 2017, which claims priority to U.S. Provisional Application No. 62/316,029, filed on Mar. 31, 2016, entitled "Method for Collective Contribution Video Creation and Messaging," the disclosures of which are incorporated herein by reference.

TECHNICAL FIELD

The subject matter of the present invention generally relates to the field of methods of messaging and social media interaction. More specifically, this invention is related to the method of creating video messages and regulating the exchange of virtual communication messages between those users.

DESCRIPTION OF THE DRAWINGS

It should be understood that the drawings are not necessarily to scale; instead, emphasis has been placed upon illustrating the principles of the invention. In addition, in the embodiments depicted herein, like reference numerals in the various drawings refer to identical or near identical elements.

BACKGROUND OF THE INVENTION

Figure 1:
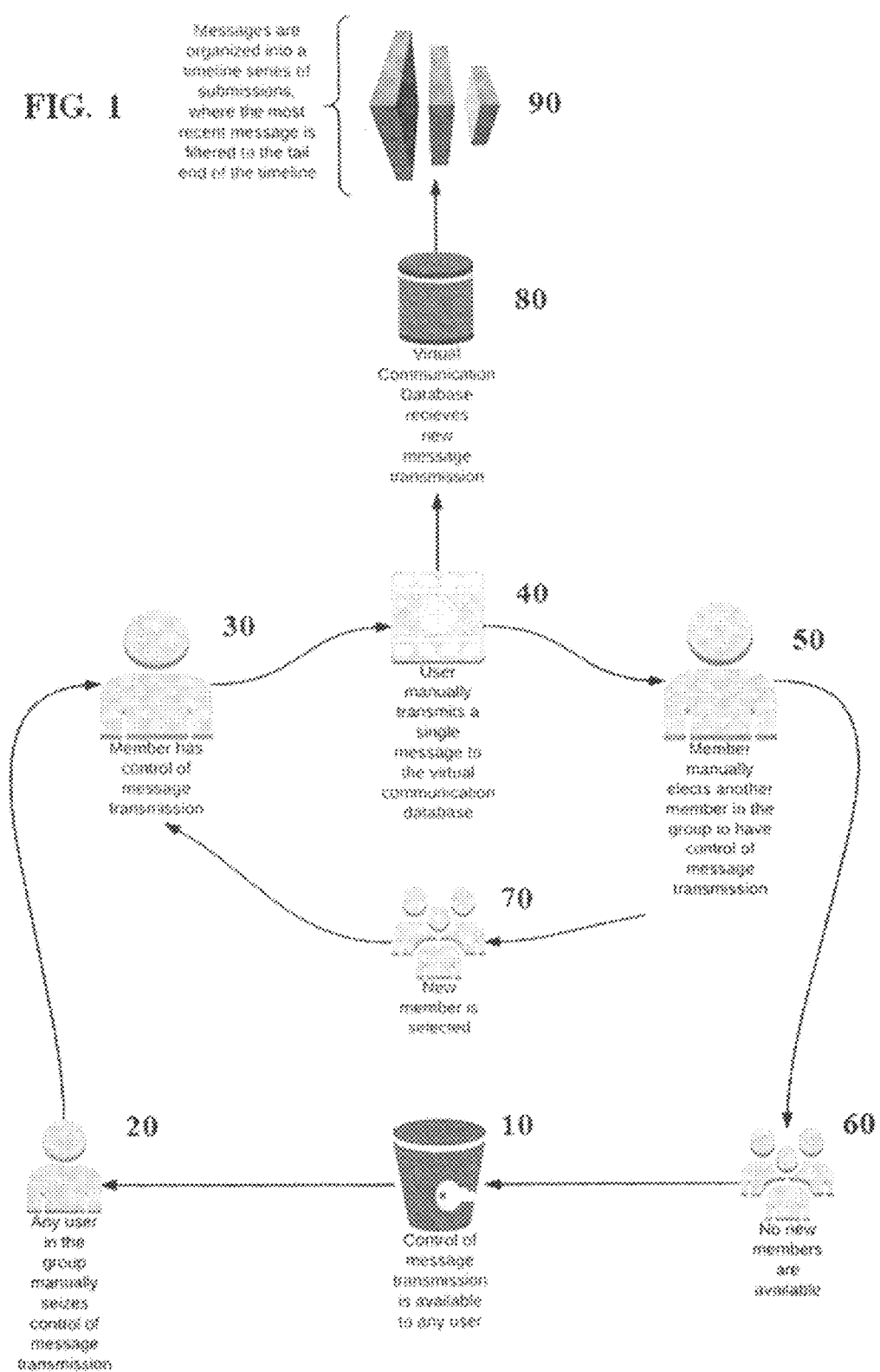
FIG. 1 provides a general overview of the operation of the disclosed Method for Collective Contribution Video Creation and Messaging.

The concatenation of pictures and videos in real time has become a standard method of communication in individual and large group settings. Recent advancements in the organization of content in real time ("stories") have allowed individuals and groups to provide in-the-moment communication to other persons or groups. The result of this new style of communication is that applications or "apps" that concatenate pictures and videos in real time are becoming a preferred method of communication among individuals and groups. In addition to individuals and groups communicating to other individuals and groups, this new form of communication has become a favorite of businesses looking to advertise and market to potential customers.

As this form of communication continues to grow, a need is arising for a system to determine the order of present and future postings in these real-time communications. Several challenges have impeded such a process in the current art.

One such challenge is the quantity of content posted to a cloud-based storage location, such as servers. At the usage rates currently present in the market, users and groups on average generate one to four posts in any given ninety second period. When there is a large influx of posts, the servers require additional time to receive and broadcast the communication to the desired receiver.

For example, if user posts a five second video to a story, in the current art, there is nothing prohibiting the same user from posting another video immediately afterwards. In this same example, the app being used by the user will send the consecutive post to a server which will store and load each post individually for the party on the receiving end. In the same example, the party on the receiving end may be delayed while he or she waits for the server to prepare the back-to-back videos being communicated. This time lag limits the capabilities of this new form of communication, is inconvenient, and leads to a poor user experience.

To minimize this impact to users, these applications are forced to limit the number of devices that can post to a single story. In the current art, there is a maximum of the number of users that can communicate regarding a single story. This limitation from the application to its user allows the application to mitigate the risk of multiple users submitting posts, making the lag time in the communication minimal. In the present art, if it is desired that a single story communicate across a substantial number of users, the user is forced to choose an alternative method of communication.

Another challenge is the quality of the content posted to the server. Since there is no limit to the amount of posts that a user may post in a given period of time, the application's servers may ultimately store a large amount of irrelevant content in order to maintain the story's communication. To use the same example from above, if the user's first post was a five second video of the long line to get on a roller coaster at Disney World, the user may follow up with a video of the same line, but zoomed in more. In this example, the user utilized two individual posts to communicate the same message. When situations like this occur, it is very common for the individual on the receiving end of the story to skip to the next post to avoid watching the duplicated message. This common act by the receiving user makes this method of communication inefficient when scaled for mass usage.

To minimize this inefficiency, these applications may intervene with a manual review process to allow the content from multiple users to be included in a single story. In the present day, there are unique circumstances in which an application will hire a staff to review user posted content from individual stories and manually copy the content to a story for all application users to review. Continuing the previous example, if it is New Year's Eve, the application may hire a staff to capture the best "Walt Disney World Fireworks." In addition to posting about the long lines at the Disney World roller coaster in his story, the previous user may have also captured an incredible, picturesque moment of the fireworks display put on by Disney at midnight. In order for that post to be included in the application-generated "Walt Disney World Fireworks" story, a hired staff member from the application must sift through all user-submitted videos of the fireworks and select the timeline of posts that best capture the fireworks, based upon the staff member's creative discretion. Since this is a subjective selection process, the story building takes more time and does not guarantee that a user's submission will ever be selected for the story.

The present disclosure reveals a method for streamlining the process for multiple user accounts to contribute content to a single story on a mass scale.

SUMMARY

Disclosed herein is a method for collective contribution video creation and messaging. More particularly, disclosed herein is a method for (i) determining the responsible party in a large group of users for the current video post; (ii) determining the responsible party from a large group of users for future video posts; and (iii) determining which users are unable to post.

To create the story, a program or application is used which can be run on a mobile device such as a smartphone. In this application is a virtual object that authorizes a particular user to make the immediate post to the applicable story communication. The possession of the virtual object also indicates that any user that does not have possession of the virtual object is unable to presently contribute to the group storyline. Once the user in possession of the virtual object submits his or her content, the virtual object is made available. Any user inside the story seeking to gain control may then attempt to obtain the virtual object. While there may be multiple users seeking possession of the virtual object around the same time, the application will distinguish which user will be granted control based on the earliest collected time-stamp data. Once the virtual object has determined the first user that attempted to obtain it, control is granted over the virtual object and the new user in control of communication is subject to the same process as the previous user in control.

DETAILED DESCRIPTION

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of apparatuses, mediums, frequencies, and application times. One skilled in the relevant art will recognize, however, that the disclosed Method for Collective Contribution Video Creation and Messaging may be practiced without one or more of the specific details, or with other methods, components, materials, and so forth. In other instances, well-known structures, materials, or operations are not shown or described in detail to avoid obscuring aspects of the invention.

The present disclosure relates to the generation of group-generated story communication. The present disclosure further relates to forms of multimedia based group communication, wherein a systematic means of organizing priority and future priority to send videos, pictures, and other media when other users are unable to is established.

As used herein, the terms "story based communication" or "story" refer to application that allow a user or multiple users to share content in real-time with other users.

As used herein, the term content refers to media posted by the user of an application. This media may be created using the built-in camera feature of the user's electronic device. In the present embodiment, that content would be a picture or video; however, those having ordinary skill in the art will recognize that currently known or later discovered content could also be posted by the user. The posted content may then be organized into a timeline of all previous content submissions. In the preferred embodiment, the various posts are organized in a chronological fashion; however, alternative embodiments may utilize other organization systems. The new content, including all previous content in the story, is visible by other group members by scrolling through the timeline and/or electing to automate playback in a similar format, such as a slideshow.

As used herein, the term timeline refers to a form of slideshow presentation that threads the content in the selected order based upon established criteria. In the preferred embodiment, the established criteria would be time captured. The timeline presentation would then be all content captured that is played sequentially once the presentation is signaled to start by the user.

As used herein, the terms application or "apps" refer to a mobile device's program that may be used by writing in a computer language such as SWIFT or JAVA Script. Those having ordinary skill in the art will recognize additional computer languages that may be utilized.

In one embodiment, the disclosed method of relay-style messaging occurs within an application that has been downloaded, saved, or is otherwise contained on the user's device. In the preferred embodiment, the method is used on a smartphone, which has: access to the internet via Wi-Fi, cellular provided data, or other forms of internet access; the ability to record and store audio, video, and/or pictures; has a touch screen for both viewing and interaction; has speakers and/or the ability to connect to speakers; and has a power sources, such as a rechargeable battery.

The content threaded timeline can be created by a user utilizing the application or "app" that runs on an electronic device. Examples of such devices could be cell phones, smart phones, watches, wristbands, eye glasses, wireless enabled cameras, etc. The application can be completely video-based. In an additional embodiment, the application includes a text-based structure for character based messaging.

For the preferred embodiment, the application is constructed upon Apple's iOS platform using code drafted in SWIFT computer language; however, those having skill in the art will recognize that other coding languages and platforms may be used to practice the disclosed method.

The current embodiment, wherein the application is written using the SWIFT language and iOS platform, is beneficial as the application can work fluidly within the current iOS platform and will be able to continue to function as Apple evolves the iOS platform.

Figure 2:
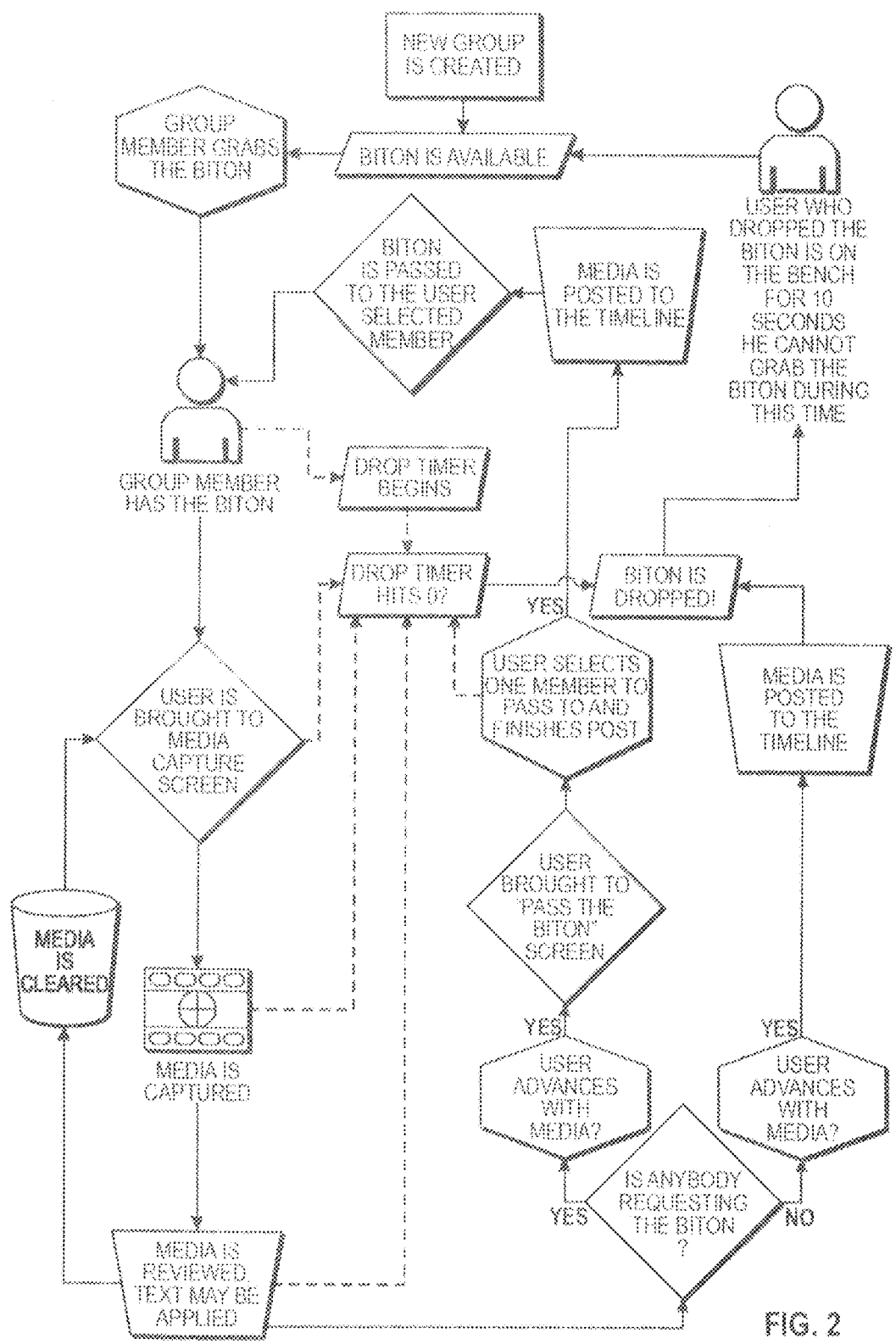
FIG. 2 provides additional details on the disclosed Method for Collective Contribution Video Creation and Messaging process of passing possession of the virtual object to users within the story-based communication.

Within the application, users are determined to be applicable to a story-based communication via invitation by the user that elects to begin a new story-based communication, which is generally shown in FIG. 2. The individual that creates the story based communication, or host, creates the criteria to determine which users are applicable to the message (or a "New Group is Created"). In the present embodiment, the host forms a group by selecting members from his list of friends within the application, but selection may be applied to other criteria, such as location, demographic, time, or other factors. By taking advantage of a "web service call", the application saves all the members in a "member table" and automatically manages different statuses for each user ('Invited', 'Joined', 'Declined'). The default status is "Invited" which does not change until a user "Accepts" the invitation making the status change to "Joined". By using this "Joined" status, the application can identify which users belong to a group and which are excluded.

The preferred embodiment of the method includes a virtual object, such as an icon (identified as a "biton" in FIG. 2), which authorizes a particular user to make the immediate post to the applicable story communication. This virtual object serves as an automated authority to the group of users participating in the story, which mitigates the risk of a single user contributing back-to-back posts, multiple posts capturing the same exact moment, or posts in succession being unrelated to what was submitted previously. For example, if a user would like to contribute content to a story, the virtual object must be in the user's possession; otherwise the user will not be able to communicate the content in the story.

Within the application, the user obtains possession of the virtual object. The possession of the virtual object indicates that the user is temporarily in control of the group communication. The possession of the virtual object also indicates that any user that does not have possession of the virtual object is unable to presently contribute to the group storyline. The user with possession of the virtual object has the authority to post the content in the pertinent group story.

The virtual object comprises a "Reach" feature that allows users seeking an opportunity to obtain possession the ability to alert the current holder of the virtual object. A queue is maintained for all users who have tapped on reach button within the application allowing the current virtual object holder to select the next turn among the users in the queue. By selecting the user, a turn posting media will be created for next holder.

If the user "grabs" the virtual object within the application, but does not post any media within a set time limit, then the application will cause the user to lose possession of the virtual object, and said user will appear on the "bench"- allowing other users within the story-based communication to obtain access. In one embodiment, this time-limit to create media is enforced by a countdown clock.

When a user posts media/or drops the virtual object, the "Object Status" Table identifies the status of virtual object with identifiers such as held, dropped, or passed. Based on the Object Status Table, there is another "Bench Table" which manages the users on the bench by monitoring an In/Out time.

The virtual object is unable to be possessed by multiple users due to the programmed "Turn Management Table", that maintains an active log users that gain access to and pass the virtual object. When a user attempts to grab the virtual object from a user in possession, the turn of this user begins and the status of virtual object will be changed (managed in the Object Status table) to "Grabbed", so a particular user will become the "Object Holder", and for the other users the virtual object status will be "Reach" that means they can reach to the virtual object for the next turn. This sequence of overlapped coding creates a protective barrier around the virtual object making only one user able to hold the virtual object.

If the user elects to accept the passed virtual object, the application will start the turn for that specific Object Holder and he/she can capture the media which will then be posted in the story based communication.

In an additional embodiment, if a user is selected to hold the virtual object, but that user has no media he or she wants to submit, the user can pass the virtual object to another user.

Once the user in possession of the virtual object submits his or her content, the virtual object is made available. Any user inside the story seeking to gain control may then attempt to obtain the virtual object. While there may be multiple users seeking possession of the virtual object around the same time, the application will distinguish which user will be granted control based on the earliest collected time-stamp data. Once the virtual object has determined the first user that attempted to obtain it, control is granted over the virtual object and the new user in control of communication is subject to the same process as the previous user in control.

All submitted media posts are sent to the storage device and, in the preferred embodiment, are assigned a unique identification number and name. The storage method utilized must have the capability of capturing and storing content from multiple devices and allow users at a moment's notice access the content that it is storing on a single device. The memory within the server may include a CSM (Computer System Memory) or RAM (Random Access Memory) in addition to other types of memory or a combination of memories.

At the time of capture and until the successful user creates a post, only the successful user's post will be stored into the storage location at that point in time. In the preferred embodiment, the storage location will be a cloud-based server; however, those having ordinary skill in the art will recognize other methods of storage. Once the post is stored in the storage location, it becomes available for viewing by other users in an organized timeline.

In the preferred embodiment, the application stores the information about the media such as submission time, user's name that posted the media, and the group id where media is posted. In the preferred embodiment, all data is stored based on Group Id to ensure multiple story based communications in the same server are not improperly combined. Submission time is also recorded in the preferred embodiment to arrange each individual story-based communication in chronological order.

In one embodiment, the application uses an internet connection to send and store data to the storage device.

FIG. 1 provides a visual representation of this method. Referring to FIG. 1, there is illustrated the capability-based model, where a single virtual object 10 represents control of the access-control mechanism. In this process, a member of the story-based communication group may manually seize control 20 of the virtual object 10 at any given time. The member who has control 30 will now have exclusive permission to transmit a single media message 40. The member who has control 30 will maintain such control for a variable period of time and/or measurable distance or until after the member 30 manually transmits a single message 40.

Also shown in FIG. 1 is the virtual communication database 80 that receives and stores new message transmissions. The database 80 forwards the newly received message to a timeline where it is organized with all previous messages 90; wherein the first message is filtered to the front end of the timeline and the most recent message is filtered to the back end of the timeline. The resulting timeline of messages 90 may be reviewed by all members of the group at any time.

In addition, shown in FIG. 1 is the process immediately following a message transmission 40. The member who recently transmitted the message 50 manually selects another member of the virtual communication group to have control. If another member(s) is available to receive control, then the member currently in control may manually forward permission to one member by choice 70. If another member is not available 60, then the member who recently transmitted the message 50 is relinquished of control and the virtual object is available to be accessed by any member 10.

The present disclosure contemplates use of this method among a pre-selected group of users. However, additional embodiments of this method have been actualized. In an additional embodiment, the baton is geotagged to a specific geographical location and the ability to take control of the virtual object and to transmit a message is available to anyone within a certain proximity to the geotagged baton. In such an embodiment, the timeline of messages 90 will be accessible to and viewable by any user that is within that geographical location.

In one embodiment, if the user in possession of the virtual object has no users seeking possession or elects not to pass the virtual object to a specific user seeking possession, the virtual object will become available for any applicable user to potentially obtain.

In one embodiment, the user-provided content is deleted after a set duration of time. This duration of time could be set by the users or by the application itself.

The disclosed method as applied to multimedia communications may also be used for the purposes of collaboration, large group communication, commercial promotion, and other uses that require stories to be scaled on a mass level.

Unlike previous limitations, the disclosed method allows users to include an unlimited amount of user accounts into a single story. This feature offers users the convenience of unlimited inclusion in the story communication, while mitigating the chances of scaling stories using a third party manual selection process.

While the disclosed apparatus and method was designed for use in social media interaction, the features and advantages of this design described in this application can be utilized by a number of different industries.

In addition to communication between individuals, the applicability of this method extends beyond such communication. For example, the automation of large group story-based communication and the organization of large amounts of picture/video content may be useful to businesses for mass-marketing.

Experiments were performed to confirm the advantages of the exemplary embodiments of the story based communication system as they relate to being able to have a massive amount of users post content within a single story. In one such experiment, approximately 50 users participated by attending a tailgate at a football game with the goal to capture the story of the five hour tailgate. These 50 users utilized the current disclosure in addition to two other communication applications available in the art. Each user was invited to join the present disclosure's story based communication designed specifically to communicate the atmosphere of the tailgate in addition to creating a story on known messaging applications. All tests were conducted using the iOS platform and the same cellular provided internet system on a given user's iPhone device. The results of this experiment confirmed that known messaging applications are unable to automate the organization of story based content designed for a specific purpose. The stories created on known messaging applications failed to coherently demonstrate the atmosphere of the tailgate from multiple user perspectives. Only the present disclosure coherently utilized story based communication to depict the atmosphere at the experimental tailgate.

For the purpose of understanding the Method for Collective Contribution Video Creation and Messaging, references are made in the text to exemplary embodiments of a Method for Collective Contribution Video Creation and Messaging, only some of which are described herein. It should be understood that no limitations on the scope of the invention are intended by describing these exemplary embodiments. One of ordinary skill in the art will readily appreciate that alternate but functionally equivalent components, materials, designs, steps, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the Method for Collective Contribution Video Creation and Messaging may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

What is claimed is:

1. A system, comprising:
   a server machine configured to support collaborative messaging between users having computing devices that are network connected to the server machine, wherein the server machine hosts a computer-executable communication application which, when executed by the server machine, is configured to perform a computer-implemented process which comprises:
   enabling an originating user to initiate a story-based communication;
   enabling the originating user to form a group of users that can participate in the story-based communication, wherein the group of users comprises the originating user and one or more additional users;
   enabling the originating user to upload an initial media object to the server machine to be included as part of the story-based communication;
   enabling another user within the group of users to upload at least one other media object to the server machine, after the originating user uploads the initial media
object to the server machine;
organizing the uploaded media objects into a timeline
series of media objects, wherein the story-based communication comprises the timelines series of media
objects; and
enabling access to the timeline series of media objects to
all users within the group of users for viewing on the
computing devices of the users, which are network
connected to the server machine.

2. The system of claim 1, wherein enabling the originating user to form the group of users comprises:
enabling the originating user to send an invitation to one
or more additional users selected by the originating
user to participate in the story-based communication;
and
forming the group of users to include all users that accept
the invitation to participate in the story-based communication.

3. The system of claim 1, wherein enabling the originating user to form the group of users comprises:
enabling the originating user to send an invitation to one
or more additional users that are located near or within
a geolocation of an event or object which is a subject
of the story-based communication initiated by the originating user; and
forming the group of users to include all users that accept
the invitation to participate in the story-based communication.

4. The system of claim 1, wherein enabling another user within the group of users to upload at least one other media object to the server machine, after the originating user uploads the initial media object to the server machine, comprises:
receiving, by the originating user, a request from a
requesting user within the group of users to upload a
media object to the server machine to contribute to the
story-based communication; and
providing, by the originating user, virtual authorization to
the requesting user to upload the media object to the
server machine.

5. The system of claim 4, wherein only a user having the virtual authorization can upload a media object to the server machine.

6. The system of claim 1, wherein enabling another user within the group of users to upload at least one other media object to the server machine, after the originating user uploads the initial media object to the server machine, comprises:
providing virtual authorization from the originating user
to a selected user within the group of users to allow the
selected user to contribute to the story-based communication, wherein only a user having the virtual authorization can upload a media object to the server
machine.

7. The system of claim 1, wherein the computer-implemented process further comprises:
generating a virtual authorization object for access by
users within the group of users participating in the
story-based communication, wherein the virtual authorization object is configured to allow only a user in
possession of the virtual authorization object to upload
a media object to the server machine; and
passing the virtual authorization object between users
within the group of users to allow a given user in
possession of the virtual authorization object to upload
a media object to the server machine while in possession of the virtual authorization object.

8. The system of claim 7, wherein passing the virtual authorization object between users comprises:
maintaining a request queue comprising an ordered
sequence of pending requests received from users
within the group of users for access to the virtual
authorization object; and
sequentially passing the virtual authorization to users
within the group in an order that corresponds to the
ordered sequence of pending requests in the request
queue.

9. The system of claim 7, wherein passing the virtual authorization object between users comprises automatically passing the virtual authorization object from a first user to a second user, after the first user in possession of the virtual authorization object uploads a media object to the server machine.

10. The system of claim 7, wherein passing the virtual authorization object between users comprises automatically passing the virtual authorization object from a first user to a second user, after an expiration of a predetermined period of time in which the first user in possession of the virtual authorization object does not upload a media object to the server machine.

11. A method, comprising:
hosting a computer-executable communication application on a server machine configured to support collaborative messaging between users having computing
devices that are network connected to the server
machine;
enabling an originating user to initiate a story-based
communication using the computer-executable communication application hosted on the server machine;
enabling the originating user to form a group of users that
can participate in the story-based communication,
wherein the group of users comprises the originating
user and one or more additional users;
enabling the originating user to upload an initial media
object to the server machine to be included as part of
the story-based communication;
enabling another user within the group of users to upload
at least one other media object to the server machine,
after the originating user uploads the initial media
object to the server machine;
organizing the uploaded media objects into a timeline
series of media objects, wherein the story-based communication comprises the timelines series of media
objects; and
enabling access to the timeline series of media objects to
all users within the group of users for viewing on the
computing devices of the users, which are network
connected to the server machine.

12. The method of claim 11, wherein enabling the originating user to form the group of users comprises:
enabling the originating user to send an invitation to one
or more additional users selected by the originating
user to participate in the story-based communication;
and
forming the group of users to include all users that accept
the invitation to participate in the story-based communication.

13. The method of claim 1, wherein enabling the originating user to form the group of users comprises:
enabling the originating user to send an invitation to one
or more additional users that are located near or within a geolocation of an event or object which is a subject of the story-based communication initiated by the originating user; and forming the group of users to include all users that accept the invitation to participate in the story-based communication.

14. The method of claim 11, wherein enabling another user within the group of users to upload at least one other media object to the server machine, after the originating user uploads the initial media object to the server machine, comprises:

receiving, by the originating user, a request from a requesting user within the group of users to upload a media object to the server machine to contribute to the story-based communication; and providing, by the originating user, virtual authorization to the requesting user to upload the media object to the server machine.

15. The method of claim 14, wherein only a user having the virtual authorization can upload a media object to the server machine.

16. The method of claim 11, wherein enabling another user within the group of users to upload at least one other media object to the server machine, after the originating user uploads the initial media object to the server machine, comprises:

providing virtual authorization from the originating user to a selected user within the group of users to allow the selected user to contribute to the story-based communication, wherein only a user having the virtual authorization can upload a media object to the server machine.

17. The method of claim 11, further comprising:

generating a virtual authorization object for access by users within the group of users participating in the story-based communication, wherein the virtual authorization object is configured to allow only a user in possession of the virtual authorization object to upload a media object to the server machine; and passing the virtual authorization object between users within the group of users to allow a given user in possession of the virtual authorization object to upload a media object to the server machine while in possession of the virtual authorization object.

18. The method of claim 17, wherein passing the virtual authorization object between users comprises:

maintaining a request queue comprising an ordered sequence of pending requests received from users within the group of users for access to the virtual authorization object; and sequentially passing the virtual authorization to users within the group in an order that corresponds to the ordered sequence of pending requests in the request queue.

19. The method of claim 17, wherein passing the virtual authorization object between users comprises automatically passing the virtual authorization object from a first user to a second user, after the first user in possession of the virtual authorization object uploads a media object to the server machine.

20. The method of claim 17, wherein passing the virtual authorization object between users comprises automatically passing the virtual authorization object from a first user to a second user, after an expiration of a predetermined period of time in which the first user in possession of the virtual authorization object does not upload a media object to the server machine.

* * * * *